(12) United States Patent
Anderson

(10) Patent No.: US 8,725,400 B1
(45) Date of Patent: May 13, 2014

(54) MICRO-BASELINE GPS ANGULAR DETERMINATION

(75) Inventor: David A. Anderson, Coggon, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1422 days.

(21) Appl. No.: 12/220,382

(22) Filed: Jul. 24, 2008

(51) Int. Cl.
*G01C 21/00* (2006.01)
*G01S 13/00* (2006.01)
*G01B 11/26* (2006.01)

(52) U.S. Cl.
USPC ................... 701/213; 342/52; 356/139.01

(58) Field of Classification Search
USPC ........................................... 701/213
See application file for complete search history.

(56) References Cited

U.S. PATENT DOCUMENTS

| | | | | |
|---|---|---|---|---|
| 4,949,089 A | * | 8/1990 | Ruszkowski, Jr. | 342/52 |
| 7,038,589 B2 | * | 5/2006 | Schmidt et al. | 340/573.1 |
| 7,088,287 B2 | * | 8/2006 | Lee et al. | 342/174 |
| 7,196,655 B1 | * | 3/2007 | Hayles et al. | 342/45 |
| 7,295,296 B1 | * | 11/2007 | Galli | 356/139.01 |
| 7,634,380 B2 | * | 12/2009 | Martin | 702/150 |

OTHER PUBLICATIONS

John Kelly et al., "Static Azimuth Determination Using a Single Handheld GPS Receiver," in *Proceedings of the Institute of Navigation Annual Meeting 2001*, Albuquerque, NM, Jun. 11-13, 2001.
Charles J. Pruszynski et al., "Tactical Far Target Location Using Position and Azimuth from a P(Y) Code GPS Attitude Determination System," in *Proceedings of the ION GPS 2001 Conference*, Salt Lake City, UT, Sep. 11-14, 2001.

* cited by examiner

*Primary Examiner* — Joy Chng
(74) *Attorney, Agent, or Firm* — Donna P. Suchy; Daniel M. Barbieri

(57) ABSTRACT

A method of determining a position of a target is disclosed. A position of a targeting instrument relative to a friendly asset is established. A signal from the friendly asset is transmitted. The signal from the friendly asset is received at first and second locations associated with the targeting instrument. An orientation of the targeting instrument relative to the friendly asset is determined based on when the signal is received at the first and second locations. The position of the targeting instrument relative to the friendly asset is compared with the orientation of the targeting instrument relative to the friendly asset, to thereby determine the orientation of the target relative to the targeting instrument.

17 Claims, 3 Drawing Sheets

MICRO-BASELINE GPS ANGULAR DETERMINATION

FIELD OF THE INVENTION

The present invention relates generally to the field of range-finding, and more particularly, to satellite-aided geolocation of targets and other objects.

BACKGROUND OF THE INVENTION

Highly accurate, but man-portable, azimuth sensing is critical to the advancement of targeting and engagement capabilities. Precise location and designation of targets, coupled with precise aiming of weaponry are crucial for success not only in conventional warfare but in asymmetric and urban conflict, particularly as light-armored and dismounted tactics are required. The key technology for achieving this precision is accurate azimuth and vertical angle (attitude) sensing by a dismounted spotter and gunner operating under adverse conditions. Several potential technologies could be designed into a man-portable target designation system. However, each of these technologies has unique limitations that limit them from providing the required accuracy. Highly accurate inertial sensors cannot easily be adapted to man-portable applications due to size, power, weight, and cost issues. Micro-electronic mechanical systems (MEMS)—based inertial sensors currently cannot provide the required accuracy. Magnetic heading sensors are too unpredictable for high accuracy use in a combat environment. Optical techniques are not practical for providing rapid angular measurements in adverse combat conditions since surveyed reference points are typically required. Multiple antenna GPS carrier-phase methods are capable of providing the required accuracy for a relatively low cost. However, the large antenna separations (antenna baselines) needed to achieve this accuracy makes it difficult to design a rapidly deployable, man-portable system.

It is therefore an object of the invention to provide a method of locating a target that is highly portable.

Another object of the invention is to provide a method of rapidly identifying a position of a target such that that the safety of those involved in the targeting operation is not compromised.

It is another object of the invention to provide a method of locating a target that incorporates known technology.

A feature of the invention is the use of a low-power, high-frequency signal from a closely-located friendly asset to provide relative location information and relative orientation information to a targeting instrument.

An advantage of the invention is the rapid obtaining of highly accurate azimuth and attitude (vertical angle) information of a target.

SUMMARY OF THE INVENTION

The invention provides A method of determining a position of a target. According to the method, a position of a targeting instrument relative to a friendly asset is established. A signal from the friendly asset is transmitted. The signal from the friendly asset is received at first and second locations associated with the targeting instrument. An orientation of the targeting instrument relative to the friendly asset is determined based on when the signal is received at the first and second locations. The position of the targeting instrument relative to the friendly asset is compared with the orientation of the targeting instrument relative to the friendly asset, to thereby determine the orientation of the target relative to the targeting instrument.

The invention also provides a method of establishing an azimuth measurement from a targeting instrument to a target. According to the method, an azimuth measurement of a targeting instrument is established relative to a friendly asset. An augmentation signal is transmitted from the friendly asset. The augmentation signal from the friendly asset is received at first and second antennas disposed at separate locations on the targeting instrument. The orientation of the targeting instrument relative to the friendly asset is determined based on when the signal is received by the first and second antennas. The azimuth measurement of the targeting instrument relative to the friendly asset is compared with the orientation of the targeting instrument relative to the friendly asset, to thereby determine the azimuth measurement from the targeting instrument to the target.

The invention further provides a method of establishing an azimuth measurement from a targeting instrument to a target. According to the method, positioning signals received by the targeting instrument are compared with positioning signals received by a friendly asset and transmitted to the targeting instrument. An azimuth measurement of a targeting instrument relative to the friendly asset is established based on the positioning signals received by the targeting instrument and the friendly asset. An augmentation signal is transmitted from the friendly asset. The augmentation signal from the friendly asset is received at first and second antennas that are disposed at separate locations on the targeting instrument. The locations of the first and second antennas define a line that is either coaxial with or parallel to a line defined by the targeting instrument and the target. An orientation of the targeting instrument relative to the friendly asset is determined based on when the signal is received by the first and second antennas. The azimuth measurement of the targeting instrument relative to the friendly asset is compared with the orientation of the targeting instrument relative to the friendly asset, to thereby determine the azimuth measurement from the targeting instrument to the target.

It is to be understood that both the foregoing general description and the following detailed description are exemplary and explanatory only and are not necessarily restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE DRAWINGS

Reference will now be made in detail to the presently preferred embodiments of the invention, examples of which are illustrated in the accompanying drawings. It is to be appreciated that corresponding reference numbers refer to generally corresponding structures.

Briefly, the invention solves the shortcomings of the art by transmitting a low-power signal to a targeting instrument from a friendly asset that is within a few yards of the targeting instrument. The low-power signal provides the relative angular position of the targeting instrument. GPS or other positioning signals received at the friendly asset and the targeting instrument provide a highly precise, absolute angular measurement of a reference baseline between the targeting instrument and the friendly asset. The absolute angular measurement to the target is computed from the absolute orientation of the reference baseline and the relative angular position of the targeting instrument.

Figure 1:
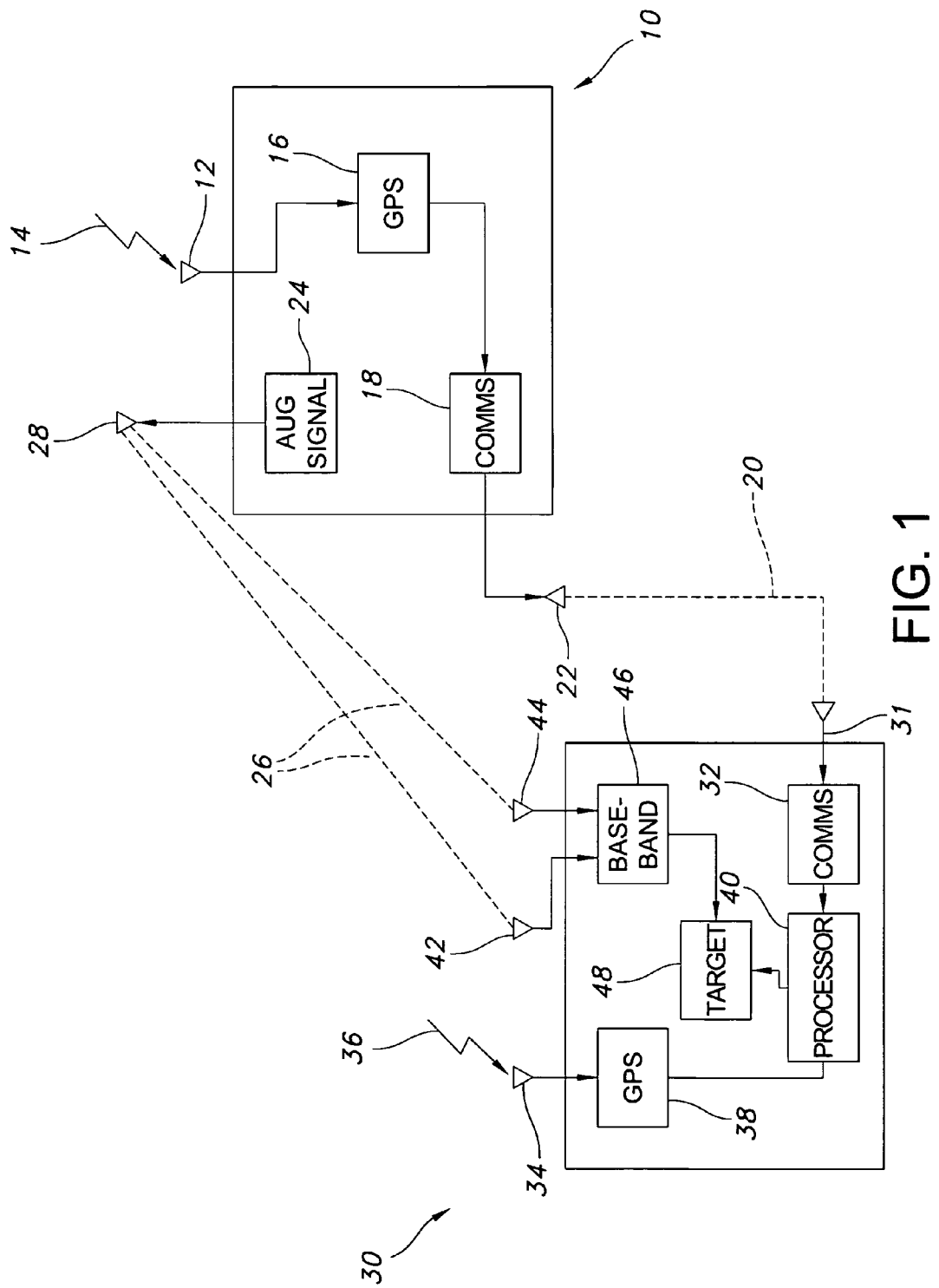
FIG. 1 is a schematic diagram of a targeting system according to the invention.
Figure 2:
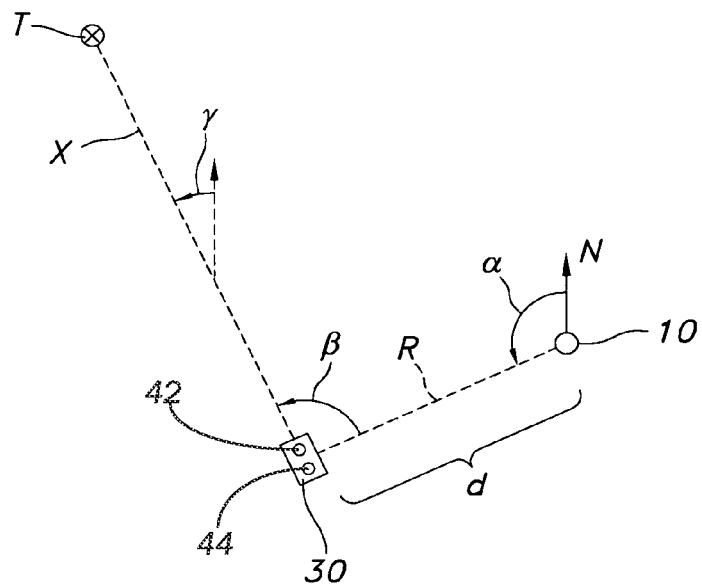
FIG. 2 is a simplified top plan view of the targeting system according to the invention.

FIG. 1 depicts a schematic diagram of a friendly asset 10 and a targeting instrument 30 according to the invention. The friendly asset is preferably a handheld receiver/transmitter and includes a GPS antenna 12 designed to receive geolocation signals 14 that are transmitted, for example, from a network of global positioning system (GPS) satellites as is known in the art. Geolocation signals 14 received by friendly asset 10 are processed by GPS circuitry 16 to determine an absolute position of the friendly asset. Communications circuitry 18 in the friendly asset incorporates the absolute position of the friendly asset into a message 20 that is transmitted, using a first baseline antenna 22, to targeting instrument 30. The targeting instrument includes a second baseline antenna 31 to receive message 20 as well as communications circuitry 32 to processes message 20 so that the absolute position of the friendly asset is obtained. The targeting instrument also includes a GPS antenna 34 to receive geolocation signals 36, which are then processed by GPS circuitry 38 to determine an absolute position of the targeting instrument. Processing circuitry 40 compares the absolute positions of the targeting unit and the friendly asset. Using known techniques such as Real-time Kinetic (RTK) techniques, processing circuitry 40 can precisely calculate the position of the targeting instrument relative to the friendly asset, which can be expressed as a reference vector or baseline R having a length d and an angular direction a relative to true North N. (FIG. 2).

Figure 3:
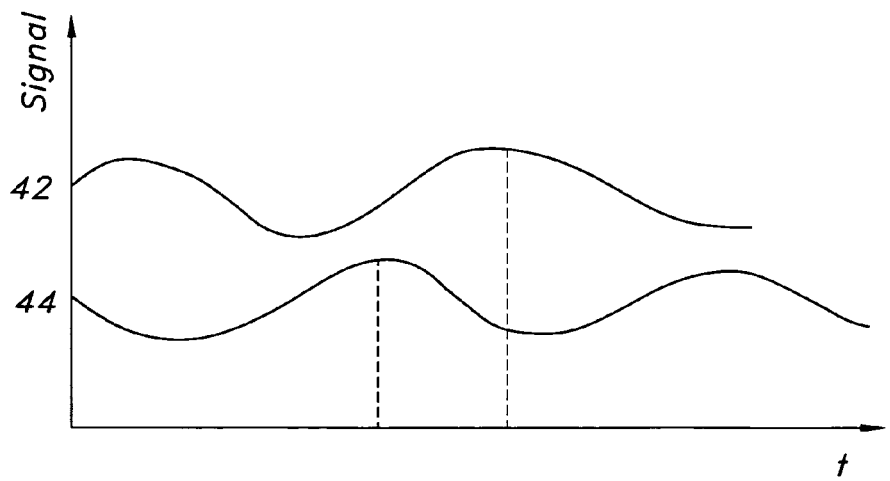
FIG. 3 is a chart showing the reception of an sinusoidal augmentation signal according to the invention.

According to the invention, friendly asset 10 also includes an augmentation signal generator that transmits an augmentation signal 26 through a first augmentation antenna 28 to second and third augmentation antennas 42, 44 that are located on targeting instrument 30. Augmentation signal 26 can have any known waveform shape such as sinusoidal, pulse-type, or any other shape suitable for radio ranging applications. The locations of the second and third augmentation antennas are chosen to have a relationship to the direction the targeting instrument is being pointed. For example, FIG. 2 depicts targeting instrument 30 pointing toward a target T along a targeting axis X. Second and third antennas 42, 44 are positioned at different places on the targeting instrument along targeting axis X. The distance between the second and third augmentation antennas 42, 44 should be sufficient to differentiate the time the augmentation signal is received by the second augmentation antenna from the time the augmentation signal is received by the third augmentation signal. If the frequency and wavelength of the augmentation signal are constant, differences in the phase angle of the signal as received by antennas 42, 44 can be used to calculate the distance from the first augmentation antenna to antennas 42, 44. For example, FIG. 3 shows the reception of a sinusoidal augmentation signal 26 as received by antennas 42 and 44. Because the crest of the oscillating augmentation signal is first received by antenna 44, it can be deduced that antenna 44 is closer to first augmentation antenna 28. Furthermore, if augmentation signal 26 includes information on when the signal was transmitted from the friendly asset, the respective distances d1, d2 from the friendly asset to the second and third augmentation antennas 42, 44 can be precisely calculated by baseband processing circuitry 46 located within targeting instrument 30. Because first and second augmentation antennas 42, 44 are at fixed positions on the targeting instruments, the distance between the antennas is known. Using distances d1 and d2 and the distance between antennas 42, 44, the angular orientation β, relative to friendly asset 10, can be accurately calculated. Finally, using known mathematical and geometric algorithms, targeting processing circuitry 48 within targeting instrument 30 uses angular direction α and angular orientation β to precisely calculate the orientation or direction γ of target T relative to the targeting instrument.

The invention as disclosed herein can be used to determine one or more directional components that describe the position of a target relative to a spotter. If a limited number of GPS signals are received by the targeting instrument and the friendly asset, only two-dimensional (e.g., latitude/longitude) positions of the components of the system can be established, and a single absolute orientation measurement between the targeting instrument and the target can be established (such as azimuth or attitude). However, if sufficient GPS information is received and incorporated into the calculations as disclosed herein, both azimuth and attitude information about the target can be determined. When combined with range-finding capabilities, such as a laser range-finder that may be incorporated into targeting instrument 30, a precise absolute position of the target can be determined without the use of triangulation techniques. If desired, an inertial sensor (not shown) may be used to provide attitude measurements.

Augmentation signal 26 can have a frequency similar to a GPS signal, or can be a GPS-like signal that possesses similar characteristics of a GPS signal but is higher in frequency. The higher the frequency, the shorter the wavelength, and this means the distance between second and third augmentation antennas can be significantly reduced when compared to known azimuth-measuring systems. An augmentation signal in the 5.8 GHz range, for example, enables targeting instrument 30 to be sufficiently small to be hand-held. This frequency range also takes advantage of superior tracking noise and multipath rejection capabilities when tracking carrier phase thereat. Because of this short distance, augmentation signal 26 and message 20 can be transmitted at a very low power, thereby enhancing battery operation and minimizing possible detection. However, a change to the frequency of the signal may increase the integration time, which is the amount of time required to process the augmentation signal. Phase measurement accuracy on the augmentation signal is such that the integration time, or the time beyond that used for standalone GPS carrier tracking and which is required to process the augmentation signal as received by second and third augmentation antennas, must be examined to ensure it does not add substantial time to the azimuth-determining process. It has been determined that for a 5.8 GHz signal, accuracies of 1 milliradian can be obtained with an integration time of less than five seconds, and accuracies of 4 milliradians require an integration time of about one second. Of course, actual system performance will be affected by other factors such as real-world calibration errors, temperature changes, and the like.

The invention can be modified in many ways while keeping within the spirit of the invention. For example, first and second baseline antennas 20, 31 can be replaced by a cable. Also, for the sake of functional clarity, friendly asset 10 is shown as having three antennas: GPS antenna 12, first baseline antenna 22, and augmentation antenna 28. It is possible to combine two or more of these antennas into a single antenna structure that performs the functions of the antennas as described herein. With respect to targeting instrument 30, it is also possible to combine two or more of GPS antenna 34, second baseline antenna 31, and one of the second and third augmentation antennas into a single antenna structure that performs the functions of the combined antennas as described herein. Second and third augmentation antennas 42, 44 may form part of a single antenna system or array only if such a system or array can differentiate the non-simultaneous reception of augmentation signal 26 as contemplated by the invention.

Second and third augmentation antennas 42, 44, are depicted as being situated along targeting axis T, but this orientation is not necessary. In fact, it is not even necessary for the positions of the second and third augmentation antennas to define a line parallel to the targeting axis. As long as the antennas are sufficiently separated from each other, the antennas can be placed at any position on or near the targeting instrument. The relative angle between the targeting axis and a line defined by the positions of the antennas can be determined and factored into the calculations the orientation of the targeting instrument relative to the friendly asset.

Figure 4:
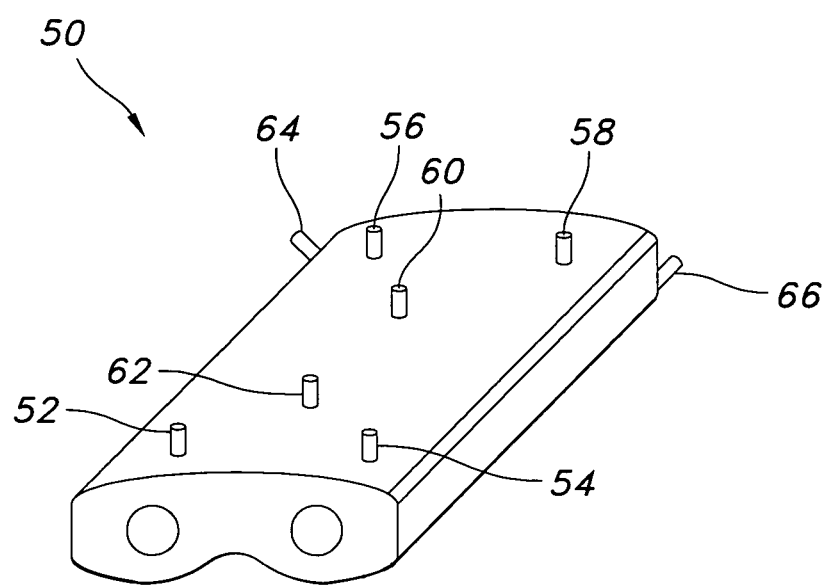
FIG. 4 is a targeting instrument according to another embodiment of the invention.

It may be desirable for the targeting instrument to have more than two augmentation antennas to receive an augmentation signal 26 from friendly asset 10. FIG. 4 depicts another embodiment of a targeting instrument 50 upon which six augmentation antennas 52, 54, 56, 58, 60, 62 are disposed. Each augmentation antenna provides the received signal to baseband processing circuitry within targeting instrument 50, where the orientation of the targeting instrument relative to the accuracy of the friendly asset is calculated based on the difference in time that the signal is received by the antennas. It is believed that multiple augmentation antennas increase the accuracy of the measurement of the orientation of the targeting instrument relative to the friendly asset. Targeting instrument 50 also includes a GPS antenna 64 and a laser range-finding apparatus 66, which as previously discussed may be used to determine an absolute position of a target.

The invention is ideal for use in adverse conditions since the friendly asset does not require a setup procedure. The relative location of the friendly asset is determined automatically by the system, and therefore does not need to be placed in a given location. In fact, the friendly asset does not need to remain stationary during the spotting operation. The friendly asset only needs to transmit its signal a short distance to the targeting instrument, so its transmit power can be kept low to avoid detection.

As described herein, the invention provides an ability for precisely locating a target using a targeting instrument and a nearby friendly asset. The invention may be used in military or non-military applications wherever surreptitious target location acquisition is desired. An advantage of the invention is that the low power requirements to transmit the augmentation signal reduces the possibility of signal detection by unfriendly surveillance.

Another advantage is that currently deployed hardware, such as handheld GPS-enabled devices with transmitting capability that are already in use in military and police scenarios, can be easily re-configured or modified to serve as a friendly assets. This is especially true when the augmentation signal is chosen to be GPS-like in form and/or frequency, as GPS-compatible antennas and circuitry have already been developed and incorporated into many handheld devices.

Still another advantage is that the friendly asset is not required to be very far from the spotter using the targeting instrument, and thereby is not required to be located in a position that may be subject to detection.

While the invention has been disclosed in its preferred form, the specific embodiments thereof as disclosed and illustrated herein are not to be considered in a limiting sense as numerous variations are possible. The subject matter of the invention includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the invention of the present disclosure.

What is claimed is:

1. A method of determining a position of a target, comprising:
   establishing a position of a targeting instrument relative to a friendly asset, and communicating the position of the friendly asset to the targeting instrument, the targeting instrument located less than approximately ten yards from the friendly asset;
   receiving a signal from the friendly asset at first and second locations associated with the targeting instrument, the distance between the first and second locations of a fixed and known length;
   determining an orientation of the targeting instrument relative to the friendly asset based on when the signal is received at the first and second locations;
   comparing the position of the targeting instrument relative to the friendly asset with the orientation of the targeting instrument relative to the friendly asset to thereby determine the orientation of the target relative to the targeting instrument;
   determining a distance from the targeting instrument to the target; and
   establishing an absolute position of the target based on
      the orientation of the target relative to the targeting instrument,
      the absolute position of the targeting instrument, and
      the distance from the targeting instrument to the target.

2. The method of claim 1, wherein the orientation of the targeting instrument relative to the friendly asset is determined by comparing timing phase measurements of the signal as received at the first and second locations.

3. The method of claim 1, wherein the position of the targeting instrument relative to the friendly asset is established by comparing positioning signals received by the targeting instrument with positioning signals received by the friendly asset and transmitted to the targeting instrument.

4. The method of claim 3, wherein the positioning signals used in establishing the position of the targeting instrument relative to the friendly asset are signals from global positioning system (GPS) transmitting sources.

5. The method of claim 1, wherein the signal is received by first and second antennas located at the first and second locations, respectively.

6. The method of claim 5, wherein the signal is received by a third antenna located at a third location associated with the targeting instrument, and wherein the orientation of the targeting instrument relative to the friendly asset is determined based on when the signal is received at the first, second and third antennas.

7. The method of claim 1, wherein the first and second locations are on the targeting instrument.

8. The method of claim 1, wherein the orientation of the target relative to the targeting instrument is an azimuth measurement.

9. The method of claim 1, wherein the orientation of the target relative to the targeting instrument is an attitude measurement.

10. A method of establishing an azimuth measurement from a targeting instrument to a target, comprising:
    establishing an azimuth measurement of a targeting instrument relative to a friendly asset by comparing positioning signals received by the targeting instrument with positioning signals received by the friendly asset and transmitted to the targeting instrument;
    receiving an augmentation signal from the friendly asset at first and second antennas disposed at separate locations on the targeting instrument, the augmentation signal having a frequency greater than approximately 5 GHz;
    determining an orientation of the targeting instrument relative to the friendly asset based on when the augmentation signal is received by the first and second antennas; and
    comparing the azimuth measurement of the targeting instrument relative to the friendly asset with the orientation of the targeting instrument relative to the friendly asset to thereby determine an azimuth measurement from the targeting instrument to the target.

11. The method of claim 10, wherein the orientation of the targeting instrument relative to the friendly asset is determined by comparing timing phase measurements of the signal as received by the first and second antennas.

12. The method of claim 10, wherein the positioning signals used in establishing the azimuth measurement from the friendly asset to the targeting instrument are signals from global positioning system (GPS) transmitting sources.

13. The method of claim 10, wherein the augmentation signal is received by a third antenna located separate from the first and second antennas, and wherein the orientation of the targeting instrument relative to the friendly asset is determined based on when the signal is received at the first, second and third antennas.

14. The method of claim 10, further comprising:
    determining a distance from the targeting instrument to the target; and
    establishing an absolute position of the target based on the azimuth measurement from the targeting instrument to the target, the absolute position of the targeting instrument, and the distance from the targeting instrument to the target.

15. The method of claim 10, wherein the positions of the first and second antennas define a line that is one of coaxial with or parallel to a line defined by the targeting instrument and the target.

16. The method of claim 10, wherein the friendly asset is less than ten meters from the targeting instrument.

17. A method of establishing an azimuth measurement from a targeting instrument to a target, comprising:
    comparing positioning signals received by the targeting instrument with positioning signals received by a friendly asset and transmitted to the targeting instrument;
    establishing an azimuth measurement of a targeting instrument relative to the friendly asset by comparing positioning signals received by the targeting instrument with positioning signals received by the friendly asset and transmitted to the targeting instrument;
    receiving an augmentation signal from the friendly asset at first and second antennas disposed at separate locations on the targeting instrument, the locations of the first and second antennas defining a line that is one of coaxial with or parallel to a line defined by the targeting instrument and a target, the augmentation signal having a frequency greater than approximately 5 GHz;
    determining an orientation of the targeting instrument relative to the friendly asset based on when the augmentation signal is received by the first and second antennas; and
    comparing the azimuth measurement of the targeting instrument relative to the friendly asset with the orientation of the targeting instrument relative to the friendly asset to thereby determine an azimuth measurement from the targeting instrument to the target.

* * * * *